July 12, 1966 F. H. BRAY ETAL 3,260,800
ELECTRICAL PULSE ARRANGEMENTS
Filed April 5, 1962
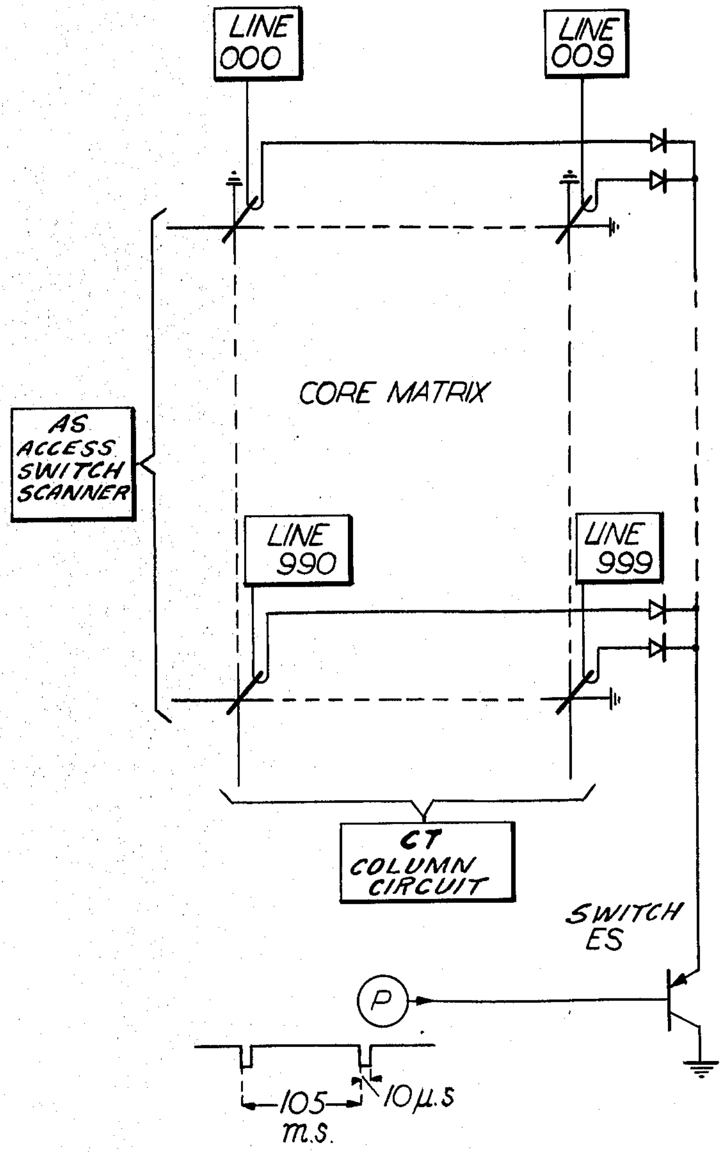
INVENTORS
F. H. BRAY
F. AMBROSINO
By [signature]
Attorney 3,260,800

ELECTRICAL PULSE ARRANGEMENTS

Frederick Harry Bray and Francesco Ambrosino, London, England, assignors to International Standard Electric Corporation, New York, N.Y., a corporation of Delaware Filed Apr. 5, 1962, Ser. No. 185,421
Claims priority, application Great Britain, Apr. 7, 1961, 12,624/61
1 Claim. (Cl. 179—9)

This invention relates to electrical pulse storage, and in particular to electrical pulse arrangements offering protection from spurious pulses.

In many systems utilising electrical pulse storage, the storage devices used are capable of being set by pulses of very short duration. If in addition these setting pulses are transmitted to the storage devices over circuits in which switching operations are liable to occur, there is a risk that voltage pulses may be generated by these switching operations and may be transmitted as spurious pulses to the storage devices, which may thus be incorrectly set. In many cases the amplitude of a spurious pulse is likely to be at least as great as that of a genuine pulse, so that amplitude discrimination is not possible. Also when the times of arrival of both genuine and spurious pulses are unknown, it is not possible to connect up the storage devices for the reception of genuine pulses only.

In many applications the duration of a spurious pulse, or of the damaging portion of a spurious pulse, is considerably shorter than that of a genuine pulse. It is then technically possible to solve the problem by inserting a filter in the pulse input lead, by which the amplitude of a short spurious pulse may be sufficiently reduced to do no damage, while the genuine pulse is merely given a somewhat slower rise-time. This method is of course well known.

When, however, there is a large number of similar inputs to the store which is formed by the storage devices, the addition of a filter to each input is very uneconomical both in cost and in bulk. In particular, where the pulse storage system is being used in preference to, say, an electromechanical system because it is cheaper and less bulky, the addition of filters may entirely counteract these advantages. Since any practicable filter has a shunt element as well as a series element, it must of course be positioned on the pulse side of the storage device so that a common filter for several inputs is not possible.

The object of the present invention is to provide an arrangement in which the deleterious effect of these spurious pulses is minimised.

According to the invention, therefore, there is provided electrical equipment for storing items of intelligence by electrical signals from a plurality of similar sources each of which is associated with an individual input to said equipment, to which spurious electrical pulses of shorter duration than the said signals and not representing items of intelligence may be connected via any of the said inputs, and in which a circuit control means is provided common to all said inputs to reduce to a negligible amount the probability that the occurrence of one or more of the said spurious electrical pulses will cause an operation of the said equipment.

Also according to the invention, there is provided electrical equipment for storing items of intelligence by electrical signals from a plurality of similar sources each of which is associated with an individual input to said equipment, wherein circuit control means is provided by means of which the said equipment is placed in a receptive condition in relation to all said inputs during regularly repeated periods of time but is prevented from being in a receptive condition in relation to any of said inputs during the intervals between said periods of time.

Also according to the invention, there is provided electrical equipment for storing meter pulses due to calls made by telephone subscribers, which comprises a number of inputs each individual to one of said subscribers and over which said meter pulses may be received, said inputs being subject to interference as a result of which spurious pulses may occur on any of said inputs, and electronic switching means common to all of said inputs and arranged to periodically enable all of said inputs for a period long enough for a pulse on an input to be stored but short compared with the normal duration of a meter pulse, said inputs being disabled between these periods, whereby the risk that a spurious pulse will be recorded as a meter pulse by the equipment is substantially reduced.

The invention may be advantageously applied to an automatic telephone subscriber's metering system of the type wherein a store is used in which the individual storage devices are magnetic cores having two possible states of remanent magnetisation and arranged in a coordinate matrix. Each core has an input winding which is permanently connected to the private wire of a subscribers' line circuit, and is intended to be set to one of its remanent states by a positive metering pulse on this private wire. The existence of a set core, indicating a meter pulse, is detected by period scanning of the matrix at a rate higher than the possible arrival rate of metering pulses, using any well-known method of pulse application to the rows of the matrix. The input winding of each core has a series rectifier to block the negative potential which may be present normally in the private wire. However, the function of releasing a call, and possibly other similar functions, will produce transient voltages of either or both polarities on the private wire, which though of short duration may yet be long enough and of sufficient amplitude to give a spurious pulse capable of setting a magnetic core.

An embodiment of the invention will now be described as applied to the foregoing type of metering system, with reference to the accompanying drawing, which shows the essential features of the store for storing meter pulses and the method which is used according to the invention to avoid the effects of a spurious pulse.

The drawing shows a rectangular matrix of magnetic ring cores, arranged in 100 rows and 10 columns, each core being represented as an edgewise view of a ring. Only the end cores in the top and bottom rows are shown. The store formed by this matrix thus has 1000 cores and caters for a group of 1000 subscribers' lines.

Each core has an input winding, connected from the private wire of a subscriber's line circuit, as indicated by the line number designation of the drawing, via an individual rectifier to an electronic switch ES common to the whole group. All the 100 cores in each column are threaded by a common vertical "output" wire which is connected to a column circuit as indicated by the bracket CT. All the 10 cores in each row are threaded by a common horizontal "access" wire and connected to an access switch as indicated at AS.

Assuming for the moment that the electronic switch ES is permanently closed, and that all the cores are in the state of negative remanence, the arrival of a (positive) meter pulse from any subscriber's line will set the corresponding core to its positive remanent state. The access switch indicated at AS but not shown, continually scans the matrix by applying pulses to the horizontal wires of the rows of cores in turn. Hence any positively set cores in a row pulsed from the access switch are switched over to the negative condition. The flux change due to such switching causes an output pulse to appear on each vertical wire which passes through a switched core. Such a pulse is stored temporarily in the appropriate column circuit, and the column circuits are scanned by a set of 10 pulses occurring between each pair of row pulses from the access switch. The timing of the pulses is such that the whole group of 1000 lines is scanned in an interval which is shorter than the minimum interval between successive meter pulses on any one line, so that all metering pulses are correctly counted. The full operation of scanning the magnetic matrix and utilising the resultant information is described in the co-pending patent application Serial No. 222,329 filed on September 10, 1962 and assigned to the assignee of this invention.

The electronic switch ES provides a method of providing an intermittent instead of a continuous circuit for the input windings of the cores. The switch must be electronic because of the short operating times involved, and may be any suitable electronic bistable device, such as a transistor circuit. It is controlled by a pulse train, obtained from pulse source P in the drawing, in such a manner that it is operated for a time which is very short, e.g. 10 microsecs. but is longer than the setting time of a core, and non-operated for an interval which is less than the minimum length of any meter pulse. Thus, with the switch ES operating in this manner, every meter pulse arriving at a line circuit will be able to set the corresponding core, in the same way as described before when switch ES was assumed permanently closed.

During the open time of switch ES however, the input circuit for any core is effectively disabled by its individual rectifier, and can be completed only through all the other rectifiers paralleled in reverse. During this time no core can be set by a pulse of either polarity, in particular by a spurious positive pulse due to switching operations. A faulty core setting can therefore occur only during the period that a spurious pulse may overlap the duration of the switching period (say 10 microsecs.) by the time necessary to set a core.

If the length of the portion of a spurious positive pulse which has sufficient amplitude to set a core be $t_s$, the length of the controlling pulse for switch ES be $t_c$, and the length of pulse to just set a core be $t_o$, it can be seen that the period during which faulty setting can ocur is:

$$T = t_s + t_c - 2t_o$$

Since this is in any case much smaller than the interval between switch ES control pulses, the probability P of the occurrence of a spurious pulse producing a fault is approximately the ratio of T to the interval between switch ES control pulses.

It is found in practice that the effective length of a spurious pulse may be about 30 microsecs. If then switch ES is switched for periods $t_c = 10$ microsecs. as suggested before, and the core can be set in $t_o =$ say, 7 microsecs. the value for T would be 26 microsecs. In this embodiment, because of the method used for producing pulses, it is convenient to use 105 millisecs. as the interval between switching periods of switch ES, the minimum length of a genuine meter pulse being about 200 millisecs. Thus the probability P of a faulty core setting would be $$26/105000 = \text{approximately } 1/4000$$

Thus the use of the invention reduces to a negligible value in practice the risk that the occurrence of a random spurious pulse will produce a faulty setting of a core.

It is obvious that the probability is least when $t_c$ is as nearly as possible equal to $t_o$, but on the other hand this margin must in practice be adequate to ensure that the electronic switch ES always gives sufficient time to set any core on a genuine meter pulse.

The foregoing description has described the invention as applied to a subscriber's metering system, but it will be evident that it could be used in many situations where it is possible to insert a control in a part of the receiving circuit common to all inputs.

It is to be understood that the foregoing description of specific examples of this invention is not to be considered as a limitation on its scope.

What we claim is:

An electrical pulse storage system for storing information obtained as electrical meter pulses from a plurality of similar sources, said storage system comprising magnetic core matrix means having only one of said cores individual to each of said sources, said cores capable of being set responsive to the individual passage therethrough of said electrical pulses, switching means common to all of said sources, switching control pulse generating means connected to said switching means for generating enabling pulses that periodically cause the operation of said switching means to enable said matrix for a period less than the width of spurious pulses but greater than the set time of said cores, and repeating said operation periodically so that at least two such operations occur within the width of any of said meter pulses, and coupling means operated responsive to said switching means in a closed position for enabling the passage of said meter pulses from any of said sources through the said individually associated core to set said associated core responsive to said meter pulses while precluding setting said other of said cores responsive to spurious pulses, said coupling means including lines extending from each of said sources through the associated core and unidirectional means in each of said lines for controlling the current direction through said lines.

References Cited by the Examiner

UNITED STATES PATENTS

| | | | |
|---|---|---|---|
| 2,739,300 | 3/1956 | Haynes | 340—174 |
| 2,854,517 | 9/1958 | Heetman | 340—174 |
| 2,902,677 | 9/1959 | Counihan | 340—174 |
| 2,914,748 | 11/1959 | Anderson | 340—166 |
| 2,920,315 | 1/1960 | Markowitz et al. | 340—174 |
| 2,933,563 | 4/1960 | Hohmann | 179—18 |
| 2,992,416 | 7/1961 | Sims | 340—174 |
| 3,027,546 | 3/1962 | Howes et al. | 340—174 |
| 3,053,936 | 9/1962 | Steinbuch et al | 179—18 |

ROBERT H. ROSE, *Primary Examiner.*

WALTER L. LYNDE, *Examiner.*

H. BOOHER, J. W. JOHNSON, *Assistant Examiners.*